April 23, 1957  K. W. COUSE  2,789,647
MOTOR VEHICLE COOLING SYSTEM WITH AUXILIARY RADIATOR
Filed July 12, 1954  2 Sheets-Sheet 1
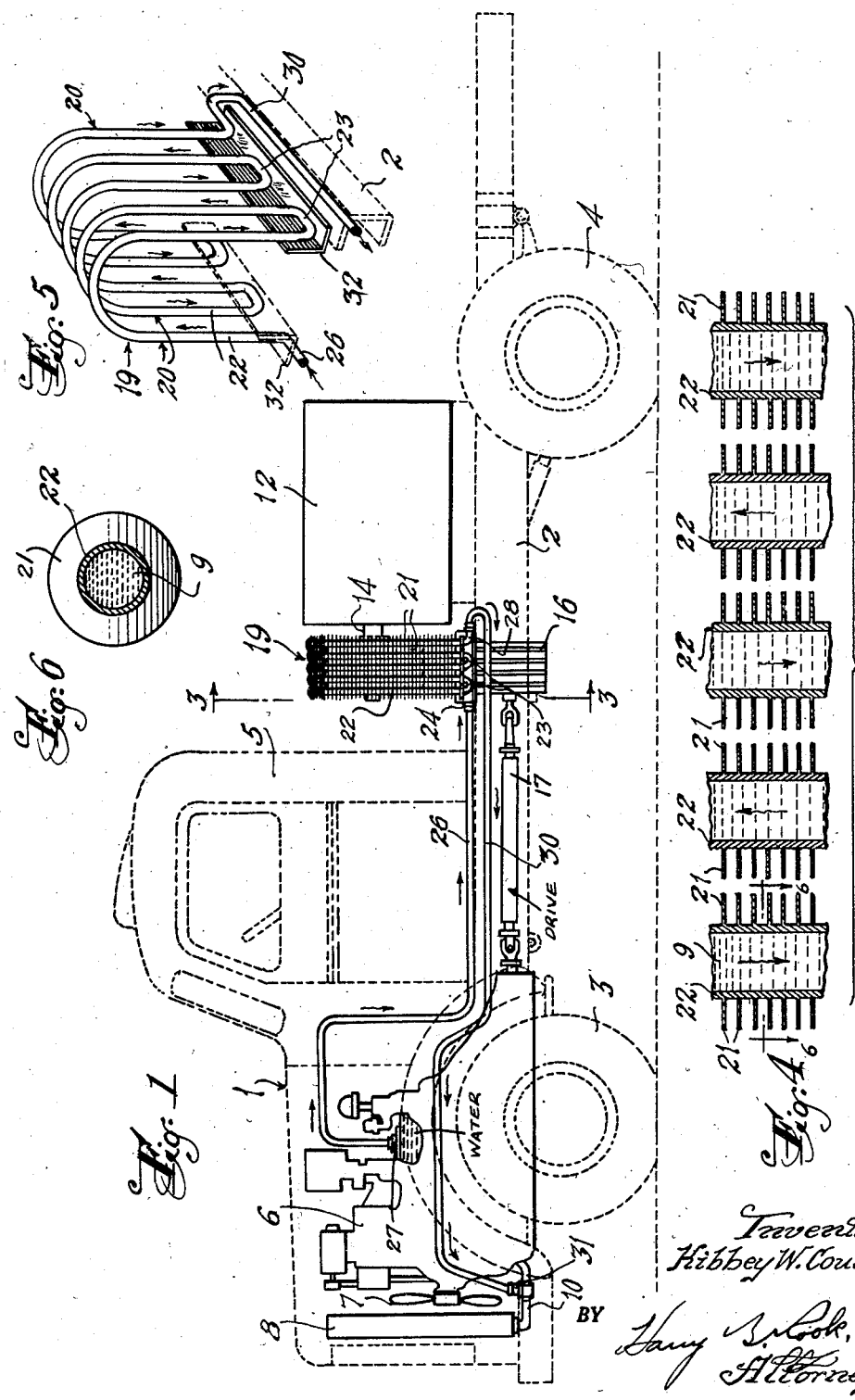

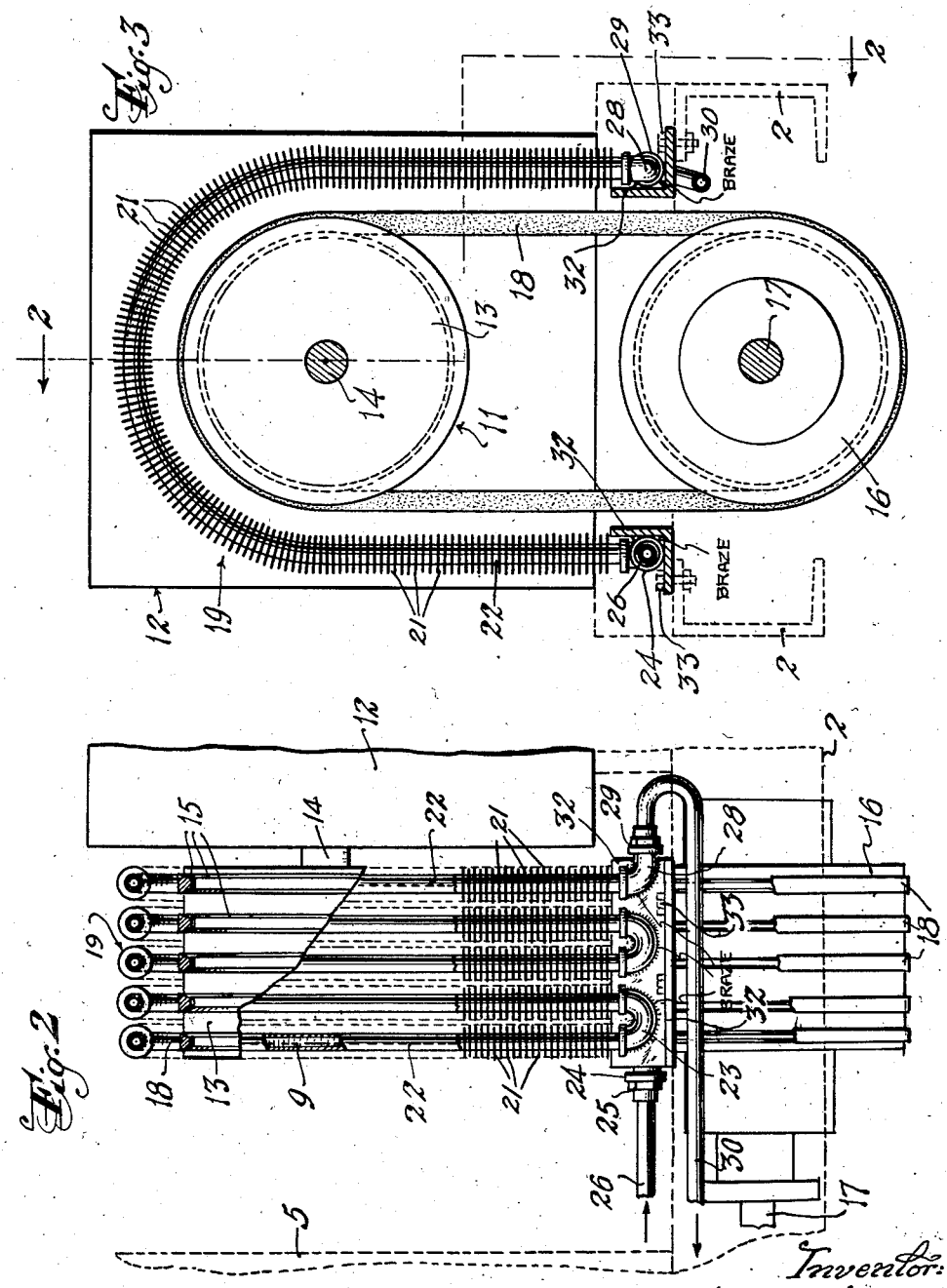

2,789,647

MOTOR VEHICLE COOLING SYSTEM WITH AUXILIARY RADIATOR

Kibbey W. Couse, Newark, N. J.

Application July 12, 1954, Serial No. 442,837

3 Claims. (Cl. 180—53)

This invention relates to engine water-cooling systems and more particularly to new and useful improvements in an auxiliary water cooling radiator for internal combustion engines.

Heavy automotive moving vehicles such as army trucks, tanks and traveling machine shops usually carry different kinds of machine tools, such as a grinder, shaper, lathe, drill press, milling machine, welding machine and other apparatus for the purpose of making repairs in the field on all types of war equipment, and in order to do so it is necessary to switch the engine of the vehicle from the differential drive shaft to one or more of the machine tools referred to, or to a shaft from which such machines may take their power. This is accomplished by providing a power take-off device such as the belt type shown in my Patent 2,390,513, issued December 11, 1945, which can be used to transfer the power drive from the vehicle engine or from some other source of power to some machine required to be driven. When the machine work is being done, the motor vehicle is stationary and a large surface for the cooling water is desirable. It is a prime object of the present invention to meet this requirement by providing an auxiliary water cooling radiator for utilizing the air currents created by the power take-off device to augment the work of the main radiator of the engine and to thereby assist in cooling the water in the engine of the motor vehicle when the vehicle is stationary.

It is another object of the present invention to provide means in common for utilizing the air currents created by a belt type power take-off structure of a motor vehicle to cool off the water in the engine and for guarding the belt drive of such structure.

A further object of the invention is to provide a cooling system for motor vehicles whereby the size of the radiator may be reduced for a given internal combustion engine, and whereby the water jacket temperature is maintained adequately low without increasing the radiator size.

Still another object of the invention is to provide an auxiliary water cooling radiator for internal combustion engines consisting of loops of pipe sections formed of highly heat conductive metal which serves to connect the water jacket of the engine to the main radiator. This auxiliary radiator is characterized by the fact that on the exterior of the loops of pipe sections, it has a plurality of heat radiating fins arranged at right angles to the sections of pipe mounting the fins. The flanged or finned pipe sections are located directly over and cover the power take-off structure of the vehicle and function to radiate or conduct off to the surrounding atmosphere a substantial portion of the heat in the water flowing therethrough, and at the same time to protect the belt drive of the take-off structure. Consequently the returning water to the main radiator has already been closed substantially below the temperature that it had on passing out of the water jacket outlet. Some of the burden is taken off of the main radiator permitting smaller sized radiators to be employed or, with a given size of radiator, more efficient cooling to be accomplished.

It is further proposed to provide an auxiliary water cooling radiator for a motor vehicle which is simple and rugged in construction, which is readily installed on conventional motor vehicles, and which may be manufactured and sold at a reasonable cost.

For further comprehension of the invention and of the objects and advantages thereof, reference will be had to the following description and accompanying drawings, and to the appended claims in which the various novel features of the invention are more particularly set forth.

On the accompanying drawings forming a material part of this disclosure:

Figure 1 is a side elevational view of a motor vehicle embodying my invention.

Figure 2 is a vertical sectional view taken on the plane of the line 2—2 of Figure 3, parts being broken away.

Figure 3 is an enlarged sectional view taken on the plane of the line 3—3 of Figure 1.

Figure 4 is an enlarged horizontal sectional view through one side of the auxiliary radiator.

Figure 5 is a perspective view of the auxiliary radiator showing diagrammatically the arrangement of the pipe sections and the direction of flow of the water.

Figure 6 is an enlarged horizontal sectional view taken on the plane of the line 6—6 of Figure 4.

Referring in detail to the drawings, wherein like numbers refer to corresponding parts, 1 designates an automotive truck having the usual type of chassis including channel-shaped side frame members 2, mounted on front and rear road wheels 3 and 4, respectively, and supporting the driver's compartment 5. On the front of the truck, an internal combustion engine 6, fan 7, and water circulating pump (not shown) all of ordinary construction, together with their connections, are supported in the usual manner. A main radiator 8 of the usual type, adapted to contain water 9, is coupled by means of a pipe 10 to the water cooling jacket of the engine 6.

A power take-off structure 11 of the belt type such as disclosed in my Patent 2,390,513 is supported on the side frame members 2 of the chassis behind the driver's compartment 5. This structure is shown connected to a machine to be driven, such as a generator indicated diagrammatically at 12 and supported on the side frame members 2 of the chassis. The power take-off structure includes a cylindrical casing 13 fixed on a shaft 14 projecting axially therethrough and outwardly thereof where it is operatively connected to the generator 12. As shown in Figure 2, the casing 13 serves as a pulley and the outer cylindrical surface of the casing is provided with a plurality of annular V-shaped belt grooves 15. A cylindrical casing 16 corresponding to the casing 5 of said patent is drivingly connected, for example as shown in said patent, to the drive shaft 17 of the vehicle which is used for driving the rear road wheels 4; and said casing also has V-shaped belt grooves in its outer periphery so that the casing can operate as a pulley. The casings or pulleys 13 and 16 are arranged in the same vertical plane and a plurality of V-shaped belts 18 are fitted in and engage the walls of the V-shaped grooves 15 of both casings or pulleys whereby the drive from shaft 17 is transmitted to the shaft 14 for operating the generator 12, for example.

When power is being taken off of the engine of the motor truck by the power take-off structure for operating a machine such as the generator 12, the motor truck 1 is stationary, and the spinning of the casings or pulleys 13 and 16 and of the belts 18 creates currents of air in the area surrounding said casings or pulleys and belts. According to the present invention, this turbulent cooling air is utilized to cool the water passing around the engine of the truck. For this purpose, an auxiliary water cooling radiator indicated generally at 19 is installed on the side frame members 2 of the chassis in the area around and in close proximity to the pulley 13 and the portions of the belts 18 and lower pulley 16 which projects above the chassis frame members 2. The auxiliary radiator 19 comprises an inverted U-shaped body composed of a plurality of inverted U-shaped pipe sections 20 arranged side by side and connected in series to form loops, five of such pipe sections being shown but of course any desired number may be used. The pipe material used is good heat conducting metal such as for example aluminum. Each pipe section 20 has a plurality of heat radiating and dissipating flanges or fins 21 on the exterior thereof which may be secured thereon by welding or in any other suitable manner, or may be formed integrally with the pipe section. The planes of the fins are disposed at right angles to the axis of that portion of the pipe section on which the fins are mounted.

The threaded free ends of the side legs 22 of the first and second adjacent U-shaped pipe sections 20, from the left hand end, on the side of the body nearer the observer as viewed in Figures 2 and 5, are connected by a threaded elbow pipe joint or coupling 23; the free ends of the legs of the second and third adjacent U-shaped pipe sections 20 at the opposite side of the body are connected by a similar elbow joint; the free ends of the legs of the third and fourth sections on the first-mentioned side of the body are similarly connected by an elbow joint; and the free ends of the legs of the fourth and fifth pipe sections on the second-mentioned side of the body are similarly connected by an elbow joint. The free end of the unjoined leg 22 of said first pipe section 20 is connected by an elbow joint 24 and nut 25 to one end of an elongated pipe 26. Pipe 26 is formed of the same metal as the pipe sections 20 and extends from the auxiliary radiator 19 forwardly to the front of the truck where it is connected to an outlet 27 formed in the jacket of the engine 6. The free end of the unjoined leg 22 of the fifth pipe section is connected by an elbow joint 28 and nut 29 to one end of an elongated pipe 30 formed of the same metal as pipe sections 20. Pipe 30 extends forwardly to the front of the truck where it is connected to the coupling pipe 10 of the main radiator 8 by a T-pipe joint 31. The auxiliary radiator 19 is supported above and close proximity to the power take-off structure by brazing the connecting elbow joints 23, 24 and 28 to angle plates 32 and fastening the plates to the side frame members 2 of the chassis of the truck by bolts 33.

From an inspection of Figures 1 and 5, it will be seen as shown by the arrows that the water from the jacket of the engine 6 is pumped rearwardly through the pipe 26 to the auxiliary radiator 19 where it passes up and down through the adjacent legs 22 of the pipe sections 20 alternately clockwise and counterclockwise, with respect to the direction of travel of the power take-off belts 18, as viewed in Figures 3 and 5, so as to provide a circuitous path and thereby to provide a large surface for the water to pass over. The water passes outwardly of the auxiliary radiator 19 through the elbow 28 to and through the pipe 30 to the pipe 10 and main radiator 8 to again follow the same cycle.

Inasmuch as the pipe sections 20 and their fins 21 together with the pipes 26 and 30 are formed of good heat conducting material and provide a large surface, a substantial amount of heat present in the water may be radiated therefrom through the fins and pipes. The flow of air generated by the revolving casings 13 and 16 and the belts 18 across the fins and across the exterior of the pipe sections is conducive to removing a substantial amount of the heat available in the water and as the rate of heat conduction increases with the difference in temperature between the water within the pipe sections and the surrounding air, it is manifest that the higher the difference between the temperatur of the water and the temperature of the surrounding air, the greater the amount of heat that will be radiated through the auxiliary radiator. Consequently the water returning to the main radiator 8 will enter said radiator at a lower temperature than would otherwise be the case, relieving the radiator of some of its burden of cooling the water before it is returned to the water jacket.

In installing the improved auxiliary radiator on a truck, it is unnecessary to alter or modify either the engine or the main radiator. The auxiliary radiator operates in a very efficient manner, cooling the water between the engine and the main radiator substantially, thus enabling either a smaller main radiator to be used, or a conventionally sized radiator to function with maximum cooling efficiency under the most severe conditions.

It is to be understood that I do not limit myself to the precise construction herein disclosed and the right is reserved to all changes and modifications coming within the scope of the invention as defined in the appended claims.

What is claimed is:

1. The combination of a chassis of a motor truck, an internal combustion engine on the front end of said chassis and having a water cooling system including a cooling jacket for the engine and a water circulating radiator connected to said jacket on the front portion of said chassis, a shaft driven by said engine and extending to the rear of the chassis, apparatus on the rear portion of the chassis to be driven by said engine and having a driven shaft, a pulley connected to said driven shaft, a second pulley coaxial with and driven by said engine shaft in parallel juxtaposition to the first-mentioned pulley, driving belts operatively connecting said pulleys and an auxiliary radiator composed of a plurality of inter-connected looped pipe sections having portions partially encompassing the periphery of one of said pulleys and having other portions in closely spaced relation to the major portions of said driving belts, and pipes connecting said looped pipe sections of the auxiliary radiator to said water jacket and said main radiator to provide for circulation of water through said main radiator, said water jacket and said auxiliary radiator and to further provide for cooling of the water flowing through said looped pipe sections by the air currents generated during operation of said pulleys and belts.

2. The combination as defined in claim 1 wherein said looped pipe sections are inverted U-shaped in form with their leg portions approximately parallel to portions of said belts, and said pipe sections being connected in series with each other to provide for flow of water in one direction through one pipe section and in the opposite direction through the next adjacent pipe section.

3. A water cooling system for internal combustion engines having cooling jackets, said system comprising a pair of pulleys operatively connected by at least one belt, means for driving one of said pulleys, and a radiator including pipe sections connected to the water jacket of the engine to provide for circulation of water through said jacket and said radiator, said pipe sections having curved portions partially encompassing the periphery of at least one of said pulleys and also having straight leg portions disposed in closely spaced and approximately parallel relation to the reaches of said belt to provide for cooling of the water circulating through said pipe sections by the air currents generated during operation of said pulleys and belt.

References Cited in the file of this patent
UNITED STATES PATENTS

| Number | Name | Date |
|---|---|---|
| 1,192,218 | Masury | July 25, 1916 |
| 1,343,494 | Bolger | June 15, 1920 |
| 1,575,692 | Knight | Mar. 9, 1926 |
| 1,696,033 | Grant | Dec. 18, 1928 |
| 1,702,565 | Foster | Feb. 19, 1929 |
| 1,886,498 | Phelps | Nov. 8, 1932 |
| 2,058,872 | Heideman | Oct. 27, 1936 |
| 2,244,063 | Hobart | June 3, 1941 |
| 2,597,549 | Trembley | May 20, 1952 |